(12) United States Patent
Krantz et al.

(10) Patent No.: US 10,727,458 B2
(45) Date of Patent: Jul. 28, 2020

(54) INTERCHANGEABLE CARRIAGE FOR AN ENERGY STORAGE AND POWER SUPPLY DEVICE

(71) Applicant: Goal Zero LLC, Bluffdale, UT (US)

(72) Inventors: Norman L. Krantz, Draper, UT (US); Henry J. Howell, Herriman, UT (US); Fred Lillywhite, Cottonwood Heights, UT (US); Keyvan Vasefi, Payson, UT (US); Walker Ford, Holladay, UT (US); Sterling Robison, Bluffdale, UT (US)

(73) Assignee: Goal Zero LLC, Bluffdale, UT (US)

( * ) Notice: Subject to any disclaimer, the term of this patent is extended or adjusted under 35 U.S.C. 154(b) by 219 days.

(21) Appl. No.: 15/661,292

(22) Filed: Jul. 27, 2017

(65) Prior Publication Data

US 2018/0034015 A1     Feb. 1, 2018

Related U.S. Application Data

(60) Provisional application No. 62/368,135, filed on Jul. 28, 2016, provisional application No. 62/368,136, (Continued)

(51) Int. Cl.
| | |
|---|---|
| *H01M 2/10* | (2006.01) |
| *H01M 10/0525* | (2010.01) |
| *H01G 9/08* | (2006.01) |
| *H02H 3/027* | (2006.01) |
| *H02H 3/087* | (2006.01) |
| *H02J 7/00* | (2006.01) |
| *H02J 1/00* | (2006.01) |
| *H02H 3/08* | (2006.01) |
| *H02H 9/02* | (2006.01) |
| *H02J 1/08* | (2006.01) |

(52) U.S. Cl.
CPC ............ *H01M 2/1016* (2013.01); *H01G 9/08* (2013.01); *H01M 10/0525* (2013.01); *H02H 3/027* (2013.01); *H02H 3/08* (2013.01); *H02H 3/087* (2013.01); *H02H 9/02* (2013.01); *H02J 1/00* (2013.01); *H02J 7/007* (2013.01); *H02J 7/0031* (2013.01); *H02J 7/0063* (2013.01); *H02J 1/082* (2020.01); *H02J 7/00304* (2020.01)

(58) Field of Classification Search
CPC ... H01M 2/1016; H01M 10/0525; H01G 9/08
See application file for complete search history.

(56) References Cited

U.S. PATENT DOCUMENTS

| | | |
|---|---|---|
| 8,080,972 B2 | 12/2011 | Smith |
| 9,024,570 B2 | 5/2015 | Workman et al. |

(Continued)

FOREIGN PATENT DOCUMENTS

| | | |
|---|---|---|
| WO | WO-2011/106431 A2 | 9/2011 |
| WO | WO-2017/118922 | 7/2017 |

*Primary Examiner* — Osei K Amponsah
(74) *Attorney, Agent, or Firm* — Foley & Lardner LLP

(57) ABSTRACT

An energy storage and power supply device includes a housing, an energy storage unit disposed within the housing, a top portion extending from the housing, a first module, and a different, second module. The top portion defines a cavity. The first module and the second module are interchangeable and removably receivable within the cavity.

6 Claims, 6 Drawing Sheets

Related U.S. Application Data filed on Jul. 28, 2016, provisional application No. 62/368,137, filed on Jul. 28, 2016, provisional application No. 62/368,147, filed on Jul. 28, 2016, provisional application No. 62/368,150, filed on Jul. 28, 2016.

(56) References Cited

U.S. PATENT DOCUMENTS

| | | |
|---|---|---|
| 9,312,706 B2 | 4/2016 | Workman et al. |
| 9,385,351 B2 | 7/2016 | Workman et al. |
| 9,388,953 B2 | 7/2016 | Workman et al. |
| 9,515,500 B2 | 12/2016 | Workman et al. |
| 9,553,481 B2 | 1/2017 | Prommel et al. |
| 2003/0142449 A1 | 7/2003 | Iwata et al. |
| 2012/0127621 A1 | 5/2012 | Knapp et al. |
| 2013/0043826 A1 | 2/2013 | Workman et al. |
| 2015/0357613 A1* | 12/2015 | Sollanek ............ H01M 2/1055 429/60 |
| 2015/0380709 A1* | 12/2015 | Mizrahi ............ H01M 2/1066 429/93 |
| 2017/0040801 A1 | 2/2017 | Robison et al. |
| 2017/0040932 A1 | 2/2017 | Lillywhite et al. |
| 2017/0047755 A1 | 2/2017 | Workman et al. |

* cited by examiner

INTERCHANGEABLE CARRIAGE FOR AN ENERGY STORAGE AND POWER SUPPLY DEVICE

CROSS-REFERENCE TO RELATED PATENT APPLICATIONS

This application claims the benefit of U.S. Provisional Patent Application No. 62/368,135, filed Jul. 28, 2016, U.S. Provisional Patent Application No. 62/368,136, filed Jul. 28, 2016, U.S. Provisional Patent Application No. 62/368,137, filed Jul. 28, 2016, U.S. Provisional Patent Application No. 62/368,147, filed Jul. 28, 2016, and U.S. Provisional Patent Application No. 62/368,150, filed Jul. 28, 2016, all of which are incorporated herein by reference in their entireties.

BACKGROUND

Energy storage and power supply devices are configured to receive and store electrical power from a power source for future use. The stored electrical power may be provided to a load device to at least one of charge and power the load device. Components of the energy storage and power supply devices are traditionally arranged in a fixed configuration.

SUMMARY

One embodiment relates to an energy storage and power supply device. The energy storage and power supply device includes a housing, an energy storage unit disposed within the housing, a top portion extending from the housing, a first module, and a different, second module. The top portion defines a cavity. The first module and the second module are interchangeable and removably receivable within the cavity.

Another embodiment relates to energy storage and power supply device. The energy storage and power supply device includes a housing and a top portion extending from the housing. The top portion has a first face defining a first aperture and an opposing second face defining a second aperture positioned to align with the first aperture. The first aperture and the second aperture cooperatively define a slot within the top portion. The slot is configured to releasably receive a module.

Still another embodiment relates to a removable carriage for an energy storage and power supply device. The removable carriage includes a base plate, a first end plate, and a second end plate. The base plate has a first end and an opposing second end. The base plate is configured to interface with a bottom surface of a cavity of the energy storage and power supply device. The first end plate is positioned at the first end of the base plate. The first end plate is configured to enclose a first aperture of the cavity defined in a first face of the energy storage and power supply device. The second end plate is positioned at the second end of the base plate. The second end plate is configured to enclose a second aperture of the cavity defined in an opposing second face of the energy storage and power supply device.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an energy storage and power supply device includes a housing and a body extending from the housing. The housing defines an internal cavity configured to receive an energy storage unit (e.g., a lithium-ion battery, etc.). The body defines a cavity. In one embodiment, the body has a first face and an opposing second face. The first face defines a first aperture and the opposing second face defines a second aperture that aligns with the first aperture such that the first aperture and the second aperture cooperatively define a slot within the cavity of the body, according to an exemplary embodiment. The energy storage and power supply device may include and/or be configured to function with a plurality of interchangeable modules. The slot within the cavity may be configured to releasably receive one of the plurality of interchangeable modules at a time. In some embodiments, the body defines a pair of slots. Each one of the pair of slots may be configured to releasably receive one of the plurality of interchangeable modules at a time. The energy storage and power supply device may include a port disposed within the cavity that is configured to electrically couple the interchangeable module to the energy storage unit. The interchangeable modules may include a standard or low capacity input module, a fast charging or high capacity input module, a generator module, a high capacity output module, an interface and communication module, a chaining module, and/or a place-holder module, among other possible modules.

According to the exemplary embodiment shown in FIGS. 1-6, an energy storage and power supply device (e.g., a solar generator, a hybrid combustion and solar generator, etc.), shown as energy storage and power supply device 10, is configured to receive and store electrical power from a power source for future use (e.g., in a remote location where electricity is not readily available, during a power outage, etc.). The power source may include a solar panel system, a combustion generator (e.g., a gasoline-fueled generator, etc.), a power supply (e.g., a 120 Volt ("V") AC wall charger, a 220V AC wall charger, a 240V AC wall charger, etc.), and/or a 12V car adapter. The stored electrical power may be provided to a load device (e.g., a smartphone, a tablet, an E-reader, a computer, a laptop, a smartwatch, a portable and rechargeable battery pack, appliances, a refrigerator, lights, display monitors, televisions, etc.) to at least one of charge and power the load device.

Figure 1:
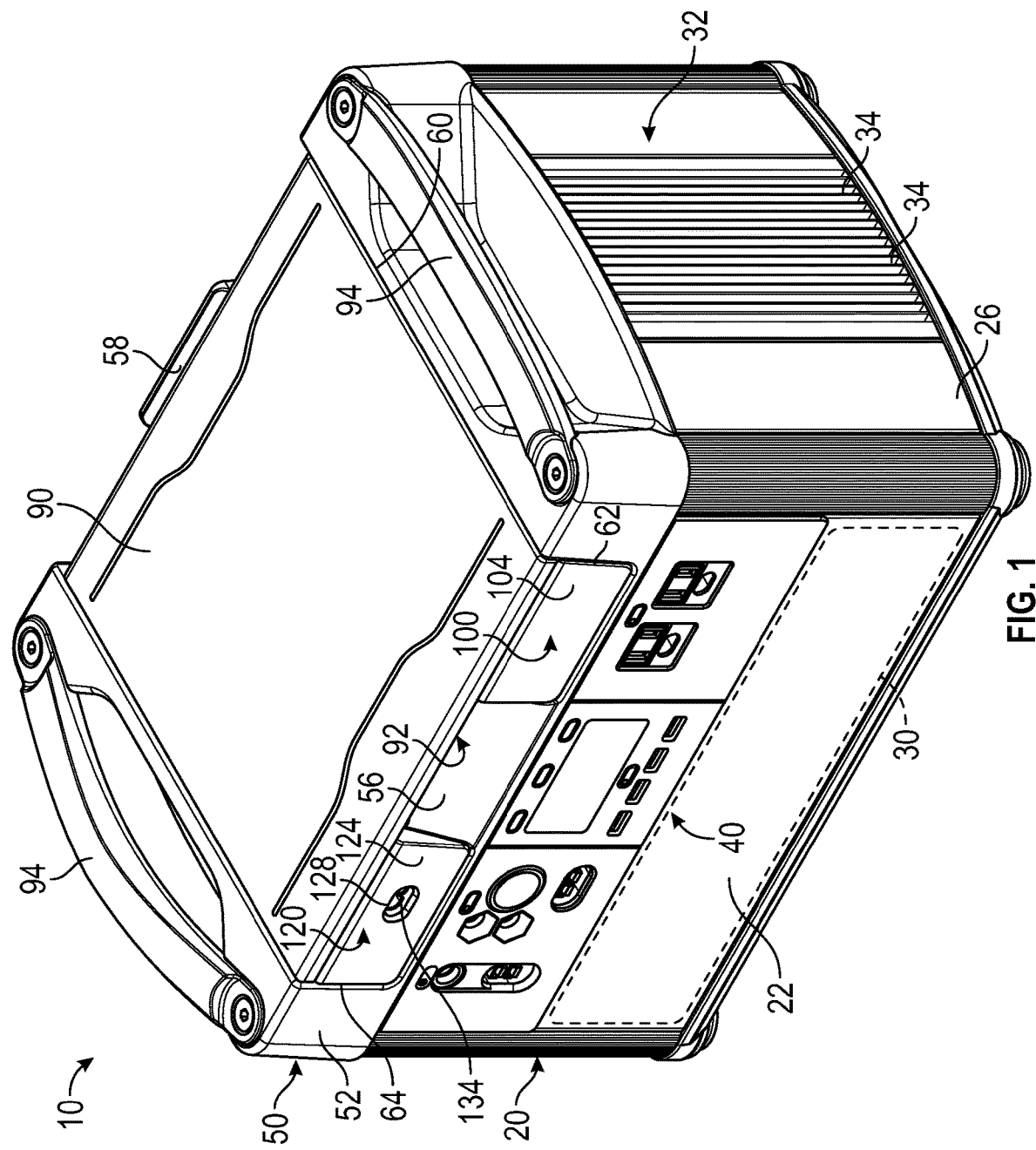
FIG. 1 is a front perspective view of an energy storage and power supply device, according to an exemplary embodiment.
Figure 2:
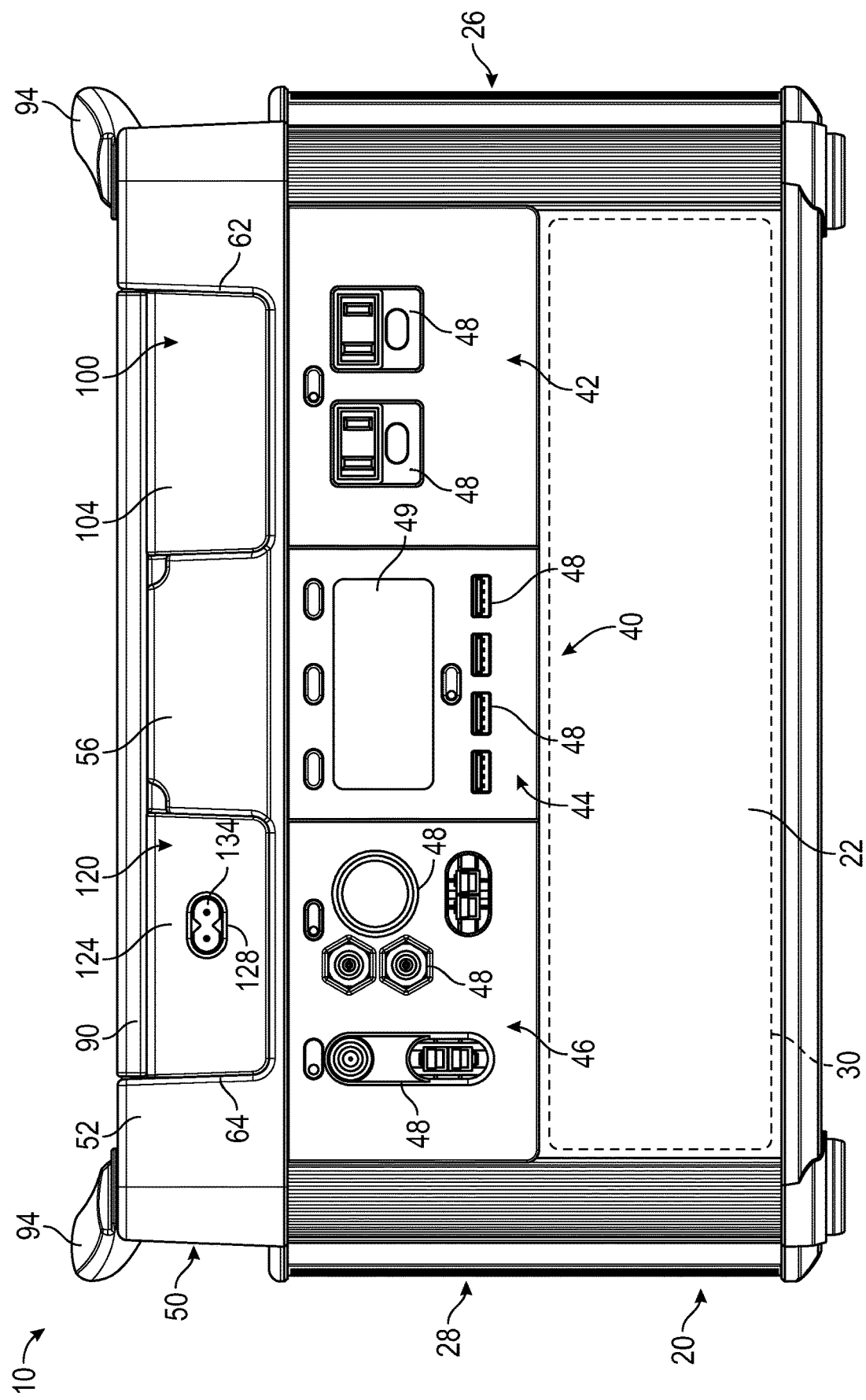
FIG. 2 is a front view of the energy storage and power supply device of FIG. 1, according to an exemplary embodiment.
Figure 3:
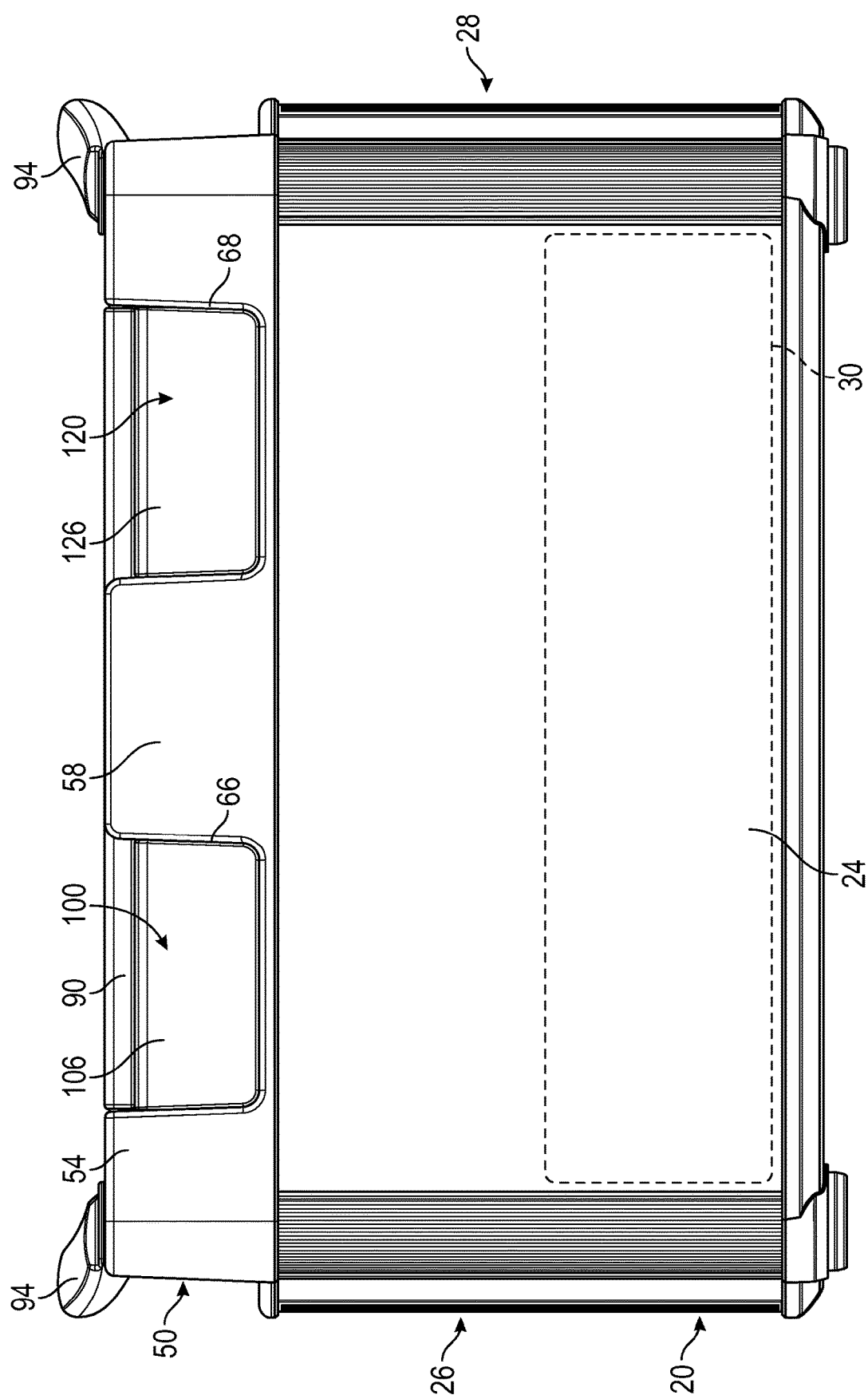
FIG. 3 is a rear view of the energy storage and power supply device of FIG. 1, according to an exemplary embodiment.

As shown in FIGS. 1-4, the energy storage and power supply device 10 includes a housing, shown as housing 20, and a body, shown as top 50. In one embodiment, the top 50 is integrally formed with the housing 20 (e.g., a unitary structure, extends therefrom, etc.). In another embodiment, the top 50 is detachably coupled to the housing 20 (e.g., with fasteners, etc.). As shown in FIGS. 1-4, the housing 20 includes a first face, shown as front wall 22, an opposing second face, shown as rear wall 24, a first sidewall, shown as right sidewall 26, and an opposing second sidewall, shown as left sidewall 28. As shown in FIGS. 1-3, the energy storage and power supply device 10 includes an energy storage unit, shown as battery 30. According to an exemplary embodiment, the front wall 22, the rear wall 24, the right sidewall 26, and the left sidewall 28 cooperatively define an internal cavity of the energy storage and power supply device 10 that receives the battery 30. The battery 30 may include one or more lithium-ion cells. According to an exemplary embodiment, the battery 30 includes a lithium-ion battery. In some embodiments, the battery 30 includes a plurality of batteries (e.g., two or more batteries connected in series, etc.). In some embodiments, the battery 30 additionally or alternatively includes another type of battery (e.g., a lead-acid battery, etc.) or another energy storage unit (e.g., one or more capacitors, etc.).

Figure 4:
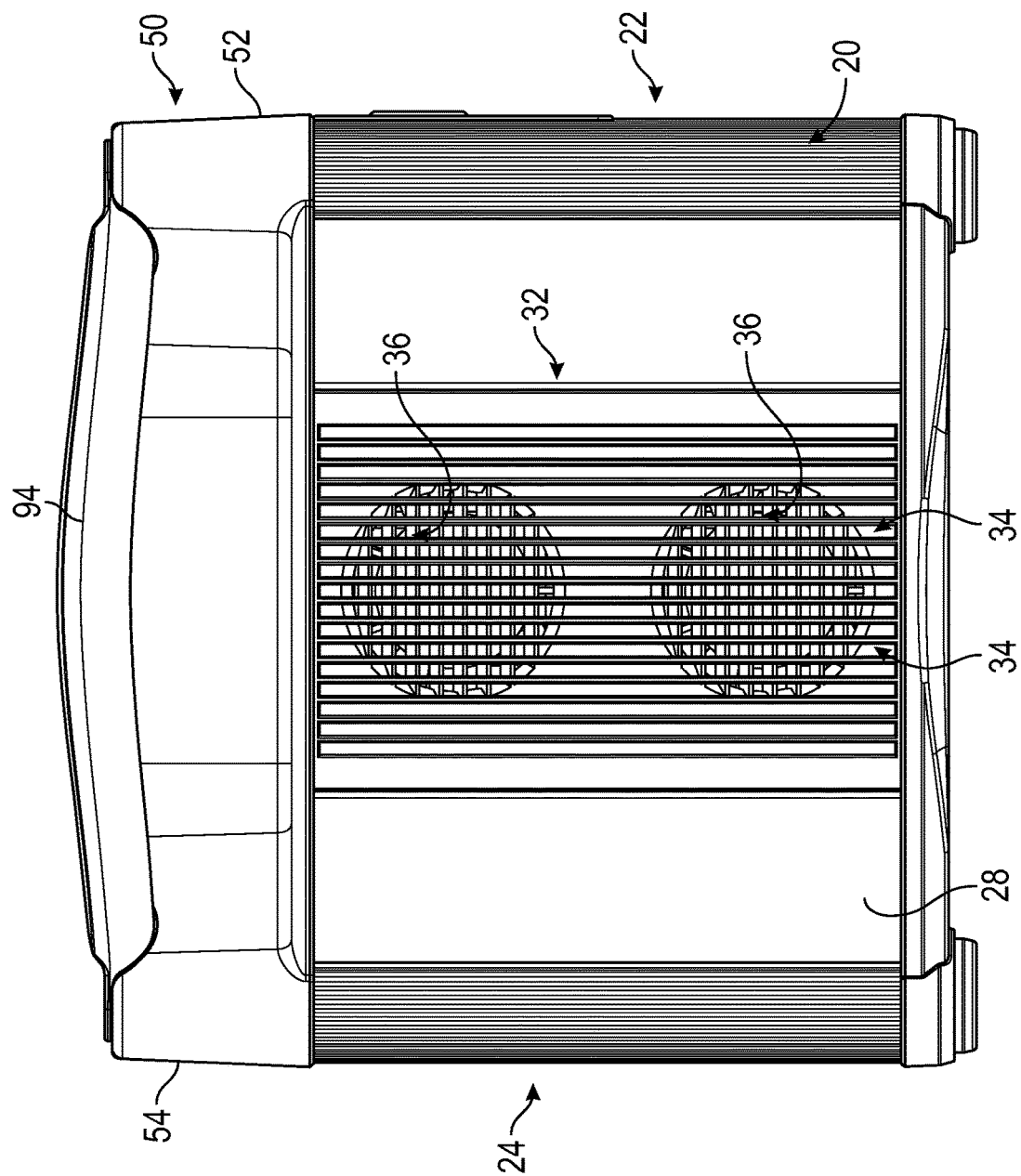
FIG. 4 is a side view of the energy storage and power supply device of FIG. 1, according to an exemplary embodiment.

As shown in FIGS. 1 and 4, the right sidewall 26 and the left sidewall 28 each include a vented portion, shown as vent 32, defining a plurality of apertures, shown as airflow apertures 34. As shown in FIG. 4, the energy storage and power supply device 10 includes a plurality of thermal regulation elements, shown as fans 36, positioned along the left sidewall 28. The energy storage and power supply device 10 may additionally or alternatively include one or more fans 36 along the right sidewall 26. The fans 36 may be positioned inward relative to the vents 32. According to an exemplary embodiment, the fans 36 are positioned to thermally regulate the temperature of the energy storage and power supply device 10 and/or the battery 30. By way of example, the fans 36 may be configured to draw thermal energy (e.g., heat, etc.) from the internal cavity in which the battery 30 is disposed, out the airflow apertures 34 of the vents 32, and into an ambient environment.

As shown in FIGS. 1 and 2, the energy storage and power supply device 10 includes an interface, shown as user interface 40, disposed along the front wall 22. In other embodiments, at least a portion of the user interface 40 is disposed on and/or along the rear wall 24, the right sidewall 26, the left sidewall 28, and/or the top 50. As shown in FIGS. 1 and 2, the user interface 40 includes a first portion, shown as first panel 42, a second portion, shown as second panel 44, and a third portion, shown as third panel 46. As shown in FIG. 2, the first panel 42 includes a first plurality of interfaces, the second panel 44 includes a second plurality of interfaces, and the third panel 46 includes a third plurality of interfaces, shown as input/output ("I/O") ports 48. The I/O ports 48 are electrically coupled to the battery 30, according to an exemplary embodiment. According to an exemplary embodiment, (i) at least a portion of the I/O ports 48 are configured to receive electrical energy from a power source (e.g., a solar panel system, a combustion generator, a power supply, a 12V car adapter, etc.) for storage by the battery 30, (ii) at least a portion of the I/O ports 48 are configured to provide the stored electrical energy within the battery 30 to a load device (e.g., a smartphone, a tablet, an E-reader, a computer, a laptop, a smartwatch, a portable and rechargeable battery pack, appliances, a refrigerator, lights, display monitors, televisions, etc.) with a power and/or charging cable connected therebetween, and/or (iii) at least a portion of the I/O ports 48 are configured to receive and provide electrical energy (e.g., operate as dual functioning ports, etc.).

According to the exemplary embodiment shown in FIG. 2, the I/O ports 48 of the first panel 42, the second panel 44, and the third panel 46 include alternating current ("AC") inverter ports (e.g., having a 110V outlet port, etc.), direct current ("DC") inputs and/or outputs, USB ports, a 6 millimeter ("mm") port, a 12V car port, a 12V powerpole port (e.g., an Anderson Powerpole, etc.), a charging port (e.g., a solar panel charging port, a combustion generator charging port, a power supply charging port, a powerpole charging port, etc.), and/or a chaining port (e.g., to electrically couple two or more of the energy storage and power supply devices 10 in series, a powerpole chaining port, etc.). As shown in FIG. 2, the second panel 44 includes a display, shown as display 49. The display 49 may provide various information regarding the state and/or operation of the energy storage and power supply device 10 and/or the battery 30 (e.g., a battery level, a current input power, a current input voltage, a current input current, a current output power, a current output voltage, a current output current, an estimated time until a full charge of the battery 30 is reached, an estimated time until full and/or permitted depletion of the battery 30 is reached, a battery temperature, an insignia, a notification, a warning, etc.).

Figure 5:
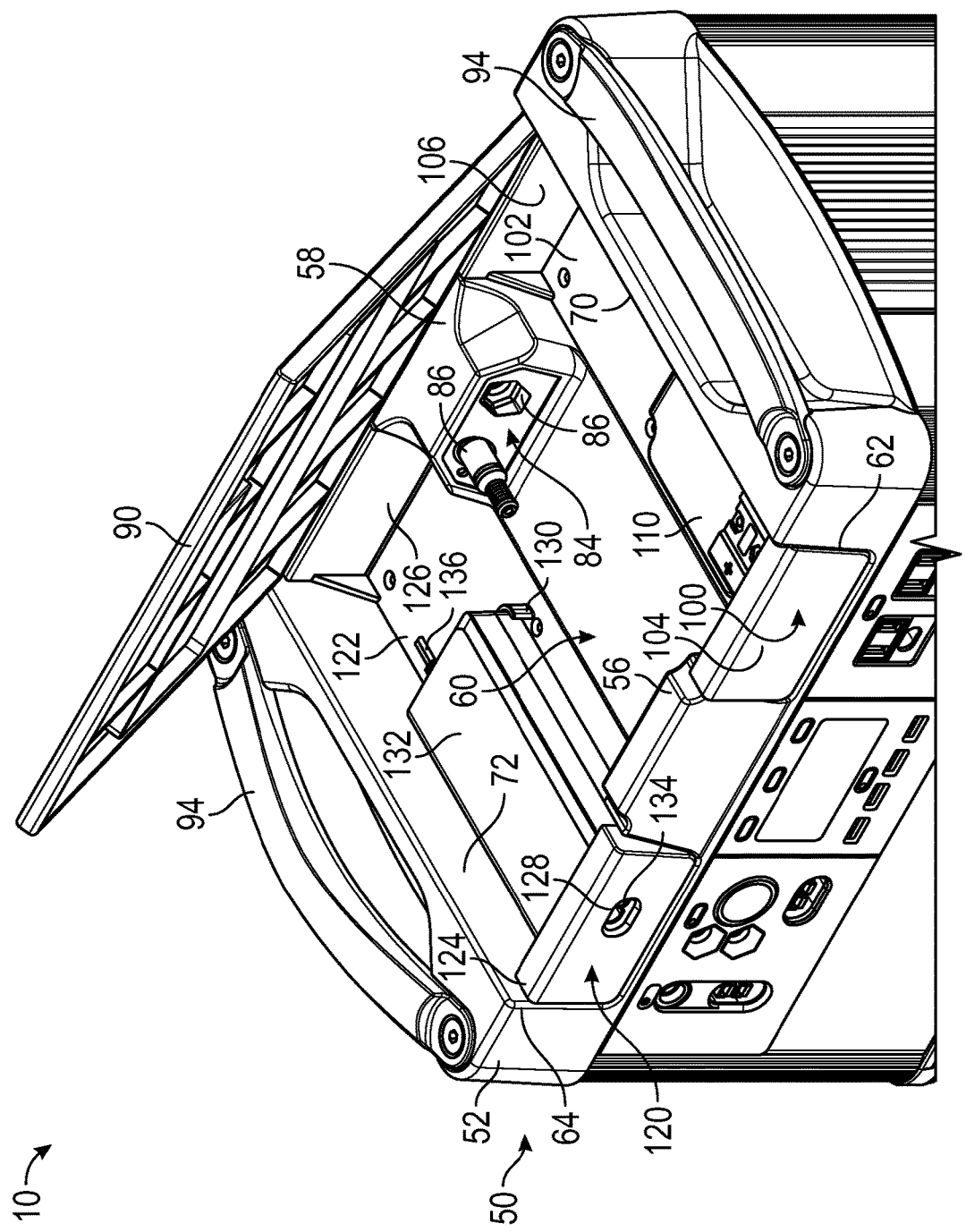
FIG. 5 is a perspective view of the energy storage and power supply device of FIG. 1 with a lid thereof selectively reconfigured in an open orientation, according to an exemplary embodiment.
Figure 6:
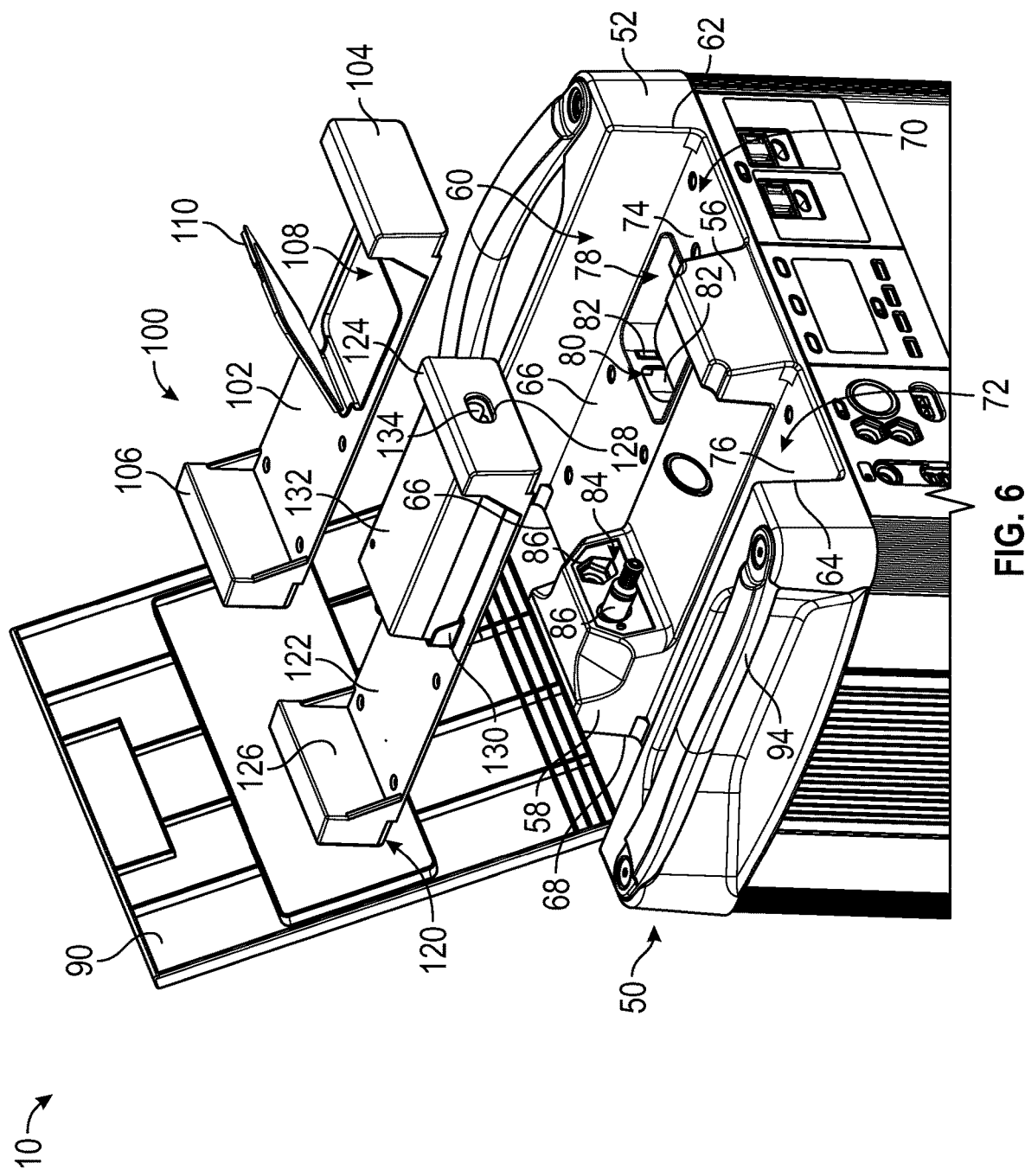
FIG. 6 is an exploded perspective view of the energy storage and power supply device of FIG. 5, according to an exemplary embodiment.

As shown in FIGS. 1-6, the top 50 of the energy storage and power supply device 10 has a first face, shown as front face 52, and an opposing second face, shown as rear face 54. As shown in FIGS. 1, 5, and 6, the top 50 defines a recess, shown as cavity 60. As shown in FIGS. 1-3, 5, and 6, the energy storage and power supply device 10 include a cover, shown as lid 90. The lid 90 is positioned to selectively enclose the cavity 60, according to an exemplary embodiment. As shown in FIGS. 1, 2, 5, and 6, the front face 52 defines a first support, shown as front support 56. As shown in FIGS. 1-3, 5, and 6, the rear face 54 defines a second support, shown as rear support 58.

According to the exemplary embodiment shown in FIG. 1, the front support 56 is positioned at an angle such that the front support 56 is recessed relative to the front face 52 of the top 50 and/or a front edge of the lid 90. An operator of the energy storage and power supply device 10 may thereby engage a front portion, shown as front lip 92, of the lid 90 to selectively reposition the lid 90 between a first orientation (e.g., a closed orientation shown in FIGS. 1-3, etc.) and a second orientation (e.g., an open orientation shown in FIGS. 5 and 6, etc.) to selectively access the cavity 60. According to an exemplary embodiment, the rear support 58 is positioned to hold the lid 90 at a target or desired angle (e.g., 95 degrees, 110 degrees, etc.) and/or prevent the lid 90 from rotating beyond the target or desired angle when selectively repositioned into the second orientation. As shown in FIGS. 1-6, the top 50 of the energy storage and power supply device 10 includes a pair of handles, shown as handles 94. According to an exemplary embodiment, the handles 94 are selectively coupled (e.g., attached, secured, etc.) to the top 50 (e.g., with fasteners, etc.). In other embodiments, the handles 94 are integrally formed with the top 50.

As shown FIGS. 1, 2, 5, and 6, the front face 52 of the top 50 defines a first aperture, shown as right aperture 62, positioned between the front support 56 and the right sidewall 26, and a second aperture, shown as left aperture 64, positioned between the front support 56 and the left sidewall 28. As shown FIGS. 3 and 6, the rear face 54 of the top 50 defines a first aperture, shown as right aperture 66, positioned between the rear support 58 and the right sidewall 26, and a second aperture, shown as left aperture 68, positioned between the rear support 58 and the left sidewall 28. As shown in FIG. 6, the right aperture 62 and the right aperture 66 are positioned to align and cooperatively form a first slot, shown as right slot 70, within the cavity 60, and the left aperture 64 and the left aperture 68 are positioned to align and cooperatively form a second slot, shown as left slot 72, within the cavity 60.

According to the exemplary embodiment shown in FIG. 6, the right slot 70 and the left slot 72 extend from the front face 52 to the rear face 54 (e.g., define through-holes, etc.) along a first surface, shown as right surface 74, and a second surface, shown as left surface 76, of the cavity 60, respectively. In other embodiments, the top 50 does not include the right aperture 62, the left aperture 64, the right aperture 66, the left aperture 68, the right slot 70, and/or the left slot 72. By way of example, the top 50 may include only the right slot 70 (e.g., may not include the left aperture 64, the left aperture 68, the left slot 72, etc.) or the left slot 72 (e.g., may not include the right aperture 62, the right aperture 66, the right slot 70, etc.). By way of another example, the front face 52 and/or the rear face 54 may be continuous (e.g., the front face 52 may not define the right aperture 62 and/or the left aperture 64, the rear face 54 may not define the right aperture 66 and/or the left aperture 68, etc.). The right slot 70 may thereby alternatively extend (i) from the right aperture 62 to the rear face 54, (ii) from the right aperture 66 to the front face 52, or (iii) between the front face 52 and the rear face 54. The left slot 72 may thereby alternatively extend (i) from the left aperture 64 to the rear face 54, (ii) from the left aperture 68 to the front face 52, or (iii) between the front face 52 and the rear face 54. In other words, the front face 52 and/or the rear face 54 may be continuous and/or solid rather than define apertures that receive modules.

As shown in FIG. 6, the right surface 74 of the right slot 70 defines a second cavity, shown as recess 78, positioned along the right slot 70 below and/or forming a portion of the cavity 60. In some embodiments, the left surface 76 of the left slot 72 additionally or alternatively defines the recess 78. As shown in FIG. 6, the recess 78 includes a second interface, shown as interface 80, having one or more ports, shown as I/O ports 82. The I/O ports 82 are electrically coupled to the battery 30, according to an exemplary embodiment. The I/O ports 82 may include a port similar to and/or different from one of the I/O ports 48 of the user interface 40 (e.g., a specialty connector, a high voltage DC output, a fast charging input, etc.).

As shown in FIG. 6, the rear support 58 includes a third interface, shown as interface 84, having one or more ports, shown as I/O ports 86. The I/O ports 86 are electrically coupled to the battery 30, according to an exemplary embodiment. The I/O ports 86 may include a port similar to and/or different from one of the I/O ports 48 of the user interface 40 and/or the I/O ports 82 of the interface 80 (e.g., a specialty connector, a high voltage DC output, a fast charging input, etc.).

As shown in FIGS. 5 and 6, the right slot 70 is configured to interchangeably (e.g., removably, detachably, etc.) receive a first module (e.g., a place-holder module, etc.), shown as first carriage 100, and the left slot 72 is configured to interchangeably receive a second module (e.g., a standard or low capacity input module, etc.), shown as second carriage 120. According to an exemplary embodiment, the first carriage 100 and/or the second carriage 120 are interchangeable (e.g., with different types of modules, with each other, are modular adapters, etc.). In other embodiments, the energy storage and power supply device 10 does not include the first carriage 100 and/or the second carriage 120.

As shown in FIGS. 5 and 6, the first carriage 100 includes a base, shown as bottom plate 102, a first plate positioned at a first end thereof, shown as front plate 104, and an a second plate positioned at an opposing second end thereof, shown as rear plate 106. According to an exemplary embodiment, the bottom plate 102 is configured to removably engage the right surface 74 of the right slot 70 (e.g., with fasteners, a snap-fit, etc.). In other embodiments, the bottom plate 102 is fixed to the right surface 74 (e.g., integrally formed therewith, adhesively coupled thereto, etc.). As shown in FIGS. 1-3 and 5, the first carriage 100 is positioned such that the front plate 104 encloses the right aperture 62 of the front face 52 and the rear plate 106 encloses the right aperture 66 of the rear face 54. In other embodiments, the first carriage 100 does not include the front plate 104 and/or the rear plate 106 (e.g., in embodiments where the front face 52 does not define the right aperture 62 and/or the rear face 54 does not define the right aperture 66, respectively, etc.).

As shown in FIG. 6, the bottom plate 102 of the first carriage 100 defines an aperture, shown as aperture 108. As shown in FIGS. 5 and 6, the first carriage 100 includes a cover, shown as door 110, positioned to selectively close the aperture 108. According to an exemplary embodiment, the aperture 108 is positioned to align with the recess 78 (e.g., when the first carriage 100 is received within the right slot 70, etc.). The door 110 may thereby facilitate selectively enclosing and accessing the interface 80 within the recess 78.

As shown in FIGS. 5 and 6, the second carriage 120 includes a base, shown as bottom plate 122, a first plate positioned at first end thereof, shown as front plate 124, and a second plate positioned at an opposing second end thereof, shown as rear plate 126. According to an exemplary embodiment, the bottom plate 122 is configured to removably engage the left surface 76 of the left slot 72 (e.g., with fasteners, a snap-fit, etc.). In other embodiments, the bottom plate 122 is fixed to the left surface 76 (e.g., integrally formed therewith, adhesively coupled thereto, etc.). As shown in FIGS. 1-3 and 5, the second carriage 120 is positioned such that the front plate 124 encloses the left aperture 64 of the front face 52 and the rear plate 126 encloses the left aperture 68 of the rear face 54. In other embodiments, the second carriage 120 does not include the front plate 124 and/or the rear plate 126 (e.g., in embodiments where the front face 52 does not define the left aperture 64 and/or the rear face 54 does not define the left aperture 68, respectively, etc.). As shown in FIGS. 1, 2, 5, and 6, the front plate 124 of the second carriage 120 defines an aperture, shown as through-hole 128. In other embodiments, the rear plate 126 of the second carriage 120 additionally or alternatively defines an aperture (e.g., similar to the through-hole 128, etc.).

As shown in FIGS. 5 and 6, the bottom plate 122 of the second carriage 120 defines a retainer, shown as flange 130 (e.g., extending from the bottom plate 122, etc.). The flange 130 is configured to selectively receive and hold a power block (e.g., an AC power block, etc.), shown as charging block 132. As shown in FIGS. 1, 2, 5, and 6, the charging block 132 includes an inlet, shown as power inlet 134. The through-hole 128 is positioned to align with the power inlet 134, according to an exemplary embodiment. According to an exemplary embodiment, the power inlet 134 is configured to electrically couple (e.g., with a power cord, etc.) to a power source (e.g., a power supply, a combustion generator, a solar panel system, etc.). As shown in FIG. 5, the charging block 132 includes an outlet, shown as power outlet 136. According to an exemplary embodiment, the power outlet 136 is configured to electrically couple to one of the I/O ports 86 (e.g., with a connector, etc.). The charging block 132 may thereby electrically couple the battery 30 to the power source to facilitate charging the battery 30 with the power source.

In some embodiments, the first carriage 100 and/or the second carriage 120 are selectively replaceable with a different type of module. The different types of modules may include a chaining carriage, an interface and communication carriage, a generator carriage, a high capacity output carriage, and/or a fast charging or high capacity input carriage, among other alternatives. The various carriages may be configured to electrically couple the energy storage and power supply device 10 and/or the battery 30 using the I/O ports 82 and/or the I/O ports 86 to a power source (e.g., a power supply, a combustion generator, a solar panel system, etc.) and/or a load device (e.g., a smartphone, a tablet, an E-reader, a computer, a laptop, a smartwatch, a portable and rechargeable battery pack, appliances, a refrigerator, lights, display monitors, televisions, etc.). In other embodiments, the modules hold and/or support a load device facilitating use thereof with the energy storage and power supply device 10.

According to an exemplary embodiment, the chaining carriage is configured to facilitate electrically coupling two or more of the energy storage and power supply devices 10 (e.g., in series, in parallel, etc.). The chaining carriage may include a chaining input port and/or a chaining output port that are electrically coupled to the battery 30 (e.g., with the I/O ports 82, the I/O ports 86, etc.). The chaining input port and/or the chaining output port of the chaining carriage may be configured to receive electrical power from and/or provide electrical power to another energy storage and power supply device 10 (e.g., increasing the total power capacity of the chained energy storage and power supply devices 10, with a connector or chaining cable, etc.). A front plate and/or a rear plate of the chaining carriage may define one or more apertures positioned to align with the chaining input port and/or the chaining output port (e.g., similar to the through-hole 128 and the power inlet 134 of the second carriage 120, etc.).

According to an exemplary embodiment, the interface and communication carriage is configured to facilitate electrically and/or communicably coupling the energy storage and power supply device 10 to a combustion generator. The interface and communication carriage may include (i) an electrical input port and/or an electrical output port that are electrically coupled to the battery 30 (e.g., with the I/O ports 82, the I/O ports 86, etc.) and/or (ii) a data port (e.g., a data input port and/or a data output port, etc.). The electrical input port and/or the electrical output port of the interface and communication carriage may be configured to receive electrical power from and/or provide electrical power to a combustion generator (e.g., to charge the battery 30 with the combustion generator, to provide electricity to start the combustion generator, with an electrical cable, etc.). The data port of the interface and communication carriage may be configured to receive data from and/or provide data to the combustion generator (e.g., one-way communication, two-way communication, etc.). In some embodiments, the interface and communication carriage includes a wireless receiver, transmitter, and/or transceiver configured to facilitate wireless data communication with the combustion generator (e.g., with Bluetooth, Wi-Fi, radio, etc.). By way of example, the energy storage and power supply device 10 may provide a signal to the combustion generator when the battery 30 is operating below a charge threshold such that the combustion generator starts and begins to provide generated electrical power to the battery 30 until the charge level of the battery is replenished (e.g., above a target charge level, etc.). By way of another example, the data communication may facilitate providing a remote start signal to either the energy storage and power supply device 10 or the combustion generator to start charging the energy storage and power supply device 10 with the combustion generator. A front plate and/or a rear plate of the interface and communication carriage may define one or more apertures positioned to align with the electrical input port, the electrical output port, and/or the data port (e.g., similar to the through-hole 128 and the power inlet 134 of the second carriage 120, etc.).

According to an exemplary embodiment, the high capacity output carriage is configured to facilitate providing a high capacity output (e.g., a high capacity DC output, a 220V output, a 240V output, etc.). The high capacity output carriage may include a high capacity output port (e.g., a 220V port, a 240V port, etc.) that is electrically coupled to the battery 30 (e.g., with the I/O ports 82, the I/O ports 86, etc.). The high capacity output port of the high capacity output carriage may be configured to provide electrical power to a high capacity load device (e.g., an appliance such as a refrigerator, a dryer, a washing machine, an air conditioner, etc.; with a high capacity electrical cable; etc.). A front plate and/or a rear plate of the high capacity output carriage may define an aperture positioned to align with the high capacity output port (e.g., similar to the through-hole 128 and the power inlet 134 of the second carriage 120, etc.).

According to an exemplary embodiment, the fast charging input carriage is configured to facilitate receiving a high capacity input (e.g., a 220V input, 240V input, etc.). The fast charging input carriage may include a fast charging input port (e.g., a 220V port, a 240V port, etc.) that is electrically coupled to the battery 30 (e.g., with the I/O ports 82, the I/O ports 86, etc.). The fast charging input port of the fast charging input carriage may be configured to receive electrical power from a high capacity power source (e.g., a 220V electrical source, a 240V electrical source, etc.) to facilitate charging the battery 30 at an increase rate (e.g., rapidly, relative to a non-high capacity input, etc.). A front plate and/or a rear plate of the fast charging input carriage may define an aperture positioned to align with the fast charging input port (e.g., similar to the through-hole 128 and the power inlet 134 of the second carriage 120, etc.).

Various alternative embodiments are contemplated. By way of example, the energy storage and power supply device 10 may define one or more slots (e.g., to removably receive modules, etc.) in various different locations (e.g., along a side, bottom, middle, etc. of the housing 20, etc.). In other embodiments, one or more of the carriages 100 and 120 include an electrical connector configured to interface directly with an electrical connector defined along the right slot 70 and/or the left slot 72. By way of example, the carriage 100 may include a male electrical connector configured to be directly received by a female connector of the energy storage and power supply device 10, (e.g., when the carriage 100 is pressed down into the right slot 70, when the carriage 100 is slid into the right slot 70, etc.).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the energy storage and power supply device as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. An energy storage and power supply device, comprising:
    a housing defining an internal cavity configured to receive a battery; and
    a top portion extending from the housing, the top portion having an outer periphery including a first face defining a first aperture and an opposing second face defining a second aperture positioned to align with the first aperture such that the first aperture and the second aperture cooperatively define a slot within the top portion that extends entirely across the top portion from the first face to the opposing second face and through the outer periphery; and
    a module releasably received by the slot, the module including:
    a base plate having a first end and an opposing second end, wherein the base plate is configured to interface with a bottom surface of the slot, and wherein the base plate includes a retainer extending therefrom;
    a first end plate positioned at the first end of the base plate, wherein the first end plate is configured to enclose the first aperture, wherein the first end plate defines a through-hole, and wherein the retainer is configured to releasably receive a power block such that a port of the power block aligns with the through-hole to facilitate electrically coupling the port to a power source external to the energy storage and power supply device through the through-hole; and
    a second end plate positioned at the opposing second end of the base plate, wherein the second end plate is configured to enclose the second aperture.

2. The energy storage and power supply device of claim 1, wherein the module comprises a first module, and wherein the first face defines a third aperture and the opposing second face defines a fourth aperture positioned to align with the third aperture such that the third aperture and the fourth aperture cooperatively define a second slot within the top portion, wherein the second slot is configured to receive a second module.

3. The energy storage and power supply device of claim 2, further comprising the first module and the second module.

4. The energy storage and power supply device of claim 3, wherein the first module and the second module are at least one of a low capacity input module, a high capacity input module, a generator module, a high capacity output module, an interface and communication module, a chaining module, or a place-holder module.

5. The energy storage and power supply device of claim 1, further comprising a lid pivotally coupled to the top portion, wherein the lid is liftable to provide access to the slot.

6. An energy storage and power supply device, comprising:
    a housing defining an internal cavity configured to receive a battery;
    a top portion extending from the housing, the top portion having an outer periphery including a first face defining a first aperture and an opposing second face defining a second aperture positioned to align with the first aperture such that the first aperture and the second aperture cooperatively define a slot within the top portion that extends entirely across the top portion from the first face to the opposing second face and through the outer periphery; and a module releasably received by the slot, the module including:

a base plate having a first end and an opposing second end, wherein the base plate is configured to interface with a bottom surface of the slot;

a first end plate positioned at the first end of the base plate, wherein the first end plate is configured to enclose the first aperture;

a second end plate positioned at the opposing second end of the base plate, wherein the second end plate is configured to enclose the second aperture; and a door pivotally coupled to the base plate and positioned to selectively close an aperture defined by the base plate.

* * * * *